Dec. 24, 1968 F. J. HODGE 3,418,433
METHOD AND SYSTEM FOR PROCESSING ANALOG INFORMATION
Filed Dec. 14, 1964
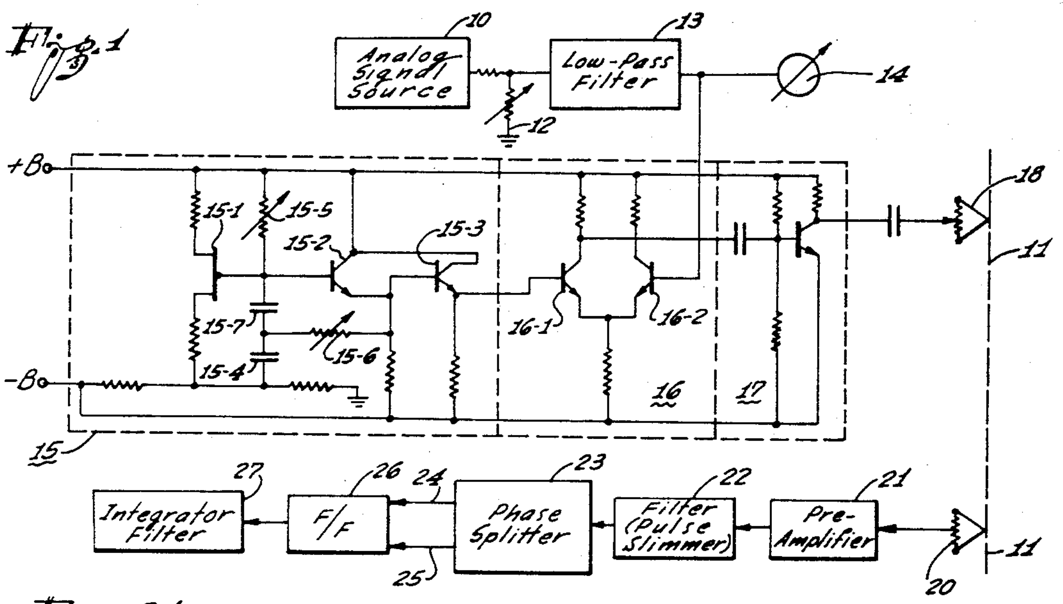
Fig. 1
Fig. 2A
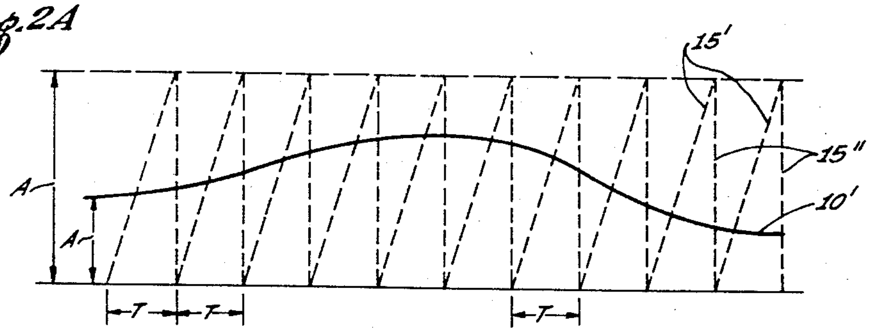
Fig. 2B
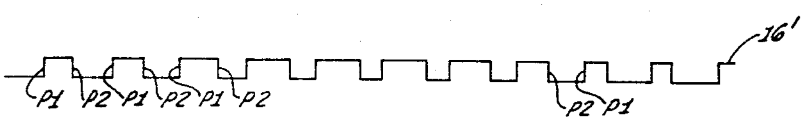
Fig. 2C (22)
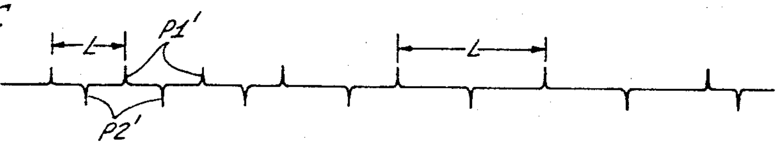
Fig. 2D (26)
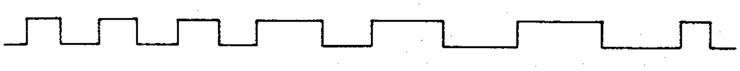
INVENTOR
Frederick J. Hodge
By Smyth, Roston & Pavitt
Attorneys United States Patent Office 3,418,433
Patented Dec. 24, 1968

3,418,433
METHOD AND SYSTEM FOR PROCESSING ANALOG INFORMATION
Frederick J. Hodge, Camarillo, Calif., assignor to Minnesota Mining and Manufacturing Company, St. Paul, Minn., a corporation of Delaware
Filed Dec. 14, 1964, Ser. No. 417,885
8 Claims. (Cl. 179—100.2)

ABSTRACT OF THE DISCLOSURE

A system for processing analog information, particularly cardiac information, is disclosed in which the analog signal is compared in a differential amplifier with sawtooth oscillations of alternating linear slope and sharp drop at a constant rate. The output pulses of the amplifier commences at each drop of the sawtooth wave and end in accordance with the analog signal value. The resulting pulse sequence is recorded on magnetic tape in form of correspondingly alternating magnetizations. Upon reproduction an alternating sequence of sharply defined pulses are produced to coincide with reversals of magnetization on the tape. These latter pulses are used, e.g., to reconstruct a replica of the differential amplifier output. Integration of this replica pulse train reconstructs the analog signal and eliminates tape flutter and wow.

The present invention relates to the processing of analog signals for purposes of recording on a magnetic storage carrier such as a magnetic tape, and retrieving such signals from the carrier.

The recording of analog signals on a magnetic tape provides considerable difficulties, if the analog signals cover a predetermined frequency range which includes constant magnitude (zero frequency) and/or quasi-stationary signals. Extreme low frequencies or DC at slowly varying quasi-stationary signal levels cannot be recorded directly, because the magnetic recording process is basically an inductive phenomenon, and in case of a DC signal directly applied to a magnetic transducer head, the signal-to-noise level attains prohibitive values.

Magnetic recording, in general, is hampered by phenomena called flutter and wow and which include irregularities in the instantaneous speed of the tape when progressing past the magnetic recording transducer. Since during playback similar irregularities are present, the distorting effect upon the signal then to be reproduced is a compounded one. Low frequency analog signals have been recorded very often by way of a frequency modulation of a carrier. This improves the signal-to-noise ratio in comparison with a straight analog recording, but such frequency modulation is not immune against tape flutter and wow. Tape flutter and wow is particularly noticeable in the low frequency range (a few hundred c.p.s. and below). Such tape flutter and wow affects the recording as simulated frequency modulation, so that the *S/N* ratio is drastically decreased.

The present invention relates to a processing method and systems of analog signals for purposes of recording same in a manner which eliminates the effect of tape speed irregularities on the waveform of the signal during recording as well as during playback thereof; the invention permits the rebuilding of the original analog signal within limits set by a predetermined frequency spectrum, but such spectrum includes the low frequencies and DC, of course, quas-stationary signals. The principle behind the invention is the production of a sequence of pulses of preferably constant amplitude value for purposes of providing a carrier type signal for recording. The pulses are being established in the following manner: Their respective leading edge is produced at a constant rate, preferably determined by an oscillator having and maintaining very accurately a constant frequency. This frequency, of course, must be well above the frequency range of interest, i.e. the frequency range of the analog signals. This pulse train is thus comprised of pulses having equidistantly spaced leading edges commencing at an exact constant frequency. The end of each pulse, i.e. its duration, is determined in accordance with the instantaneous value of the analog signal.

Within this modulation scheme, the time between the leading edges of two succeeding pulses can be interpreted as representing a constant amplitude value which is the maximum value the analog signal may attain. The width of any such pulse represents an instantaneous value of an analog signal and can be interpreted two ways. Based on the time scale of the modulation scheme, the pulse width is given as a period of true time (in milli- or microseconds). Independently therefrom, each pulse width can be interpreted as defining a particular fraction value of the fixed period of two succeeding leading edges of two such pulses. This fraction is a dimensionless value and it is the same fraction, if the analog signal were measured in units of the maximum, constant amplitude value which can be assigned to the rate of pulse occurrences. If later on during processing of the modulated signal the time scale is expanded or contracted, the modulation will not be disturbed, since each instantaneous analog value can always be interpreted as a fraction of the time between the leading edges of two succeeding pulses regardless of the absolute time value between these edges. Thus, the relation between pulse duration and the pulse initiation frequency remains constant regardless of subsequent expansion or contraction or both of the time scale used. Strictly speaking, this holds true only if such time scale expansion or contraction occurs at a rate (if oscillating) that is below the pulse initiation.

Tape flutter and wow operate as such a time scale expansion and contraction for the pulses when recorded on a tape and played back therefrom, but they will not distort the information proper. Upon playback, two interleafed pulse trains will appear, a first train representing the respective leading edges of the recording pulses, and in between each two such first train pulses there always appears one pulse of a second train and being representative of the trailing edges of the recorded pulse-signals and defining the modulated information proper. The pulses of the first train of pulses representing the leading edges of the original modulation scheme represent a time scale. Particularly, each two succeeding first train pulses (at playback) represent an individual or incremental time scale unit for their respective middle pulse. The middle pulse can be interpreted as defining the abovementioned dimensionless fraction in terms of either the maximum amplitude value defined above or the original time scale.

One knows, that originally the time distances in between two trailing edges of two pulses before recording thereof was constant, even though during playback the first train pulses do not appear anymore at a constant rate. The analog signal value modulation contained in the two pulse trains now appears expanded or contracted in the same way the time base (first train pulse frequency) thereof is expanded or contracted, so that upon reconstruction the analog value can be defined dimensionless by two immediately succeeding pulses referenced now not against true time, but against two first train pulses representing two succeeding leading edges of the original signals before recording. The original analog value can thus be restored regardless whether or not the absolute values of the respective time periods are distorted.

The restoration includes the production of an output signal train alternating between two levels established respectively by all the pulses and alternatingly representing leading and trailing edges of the modulated and recorded pulses. This output signal is filtered so as to remove the frequencies of any of these pulse trains. The filter used is similar to a filter connected conventionally to a rectifier. The envelope of the original analog signal is thereby re-established.

The invention finds utility where reproduction of the waveform of an analog signal over a wide db range is of critical importance, without necessitating evalution on an absolute time base. This holds true whenever the analog signal is subjected to further processing independent from time. Giving an example, it is of interest to evaluate the activity of the heart, whereby analog signals are provided by measuring blood pressure variation, ECG or the like, and wherein the form of the output signal is of critical importance. The invention further is instrumental when the analog signal is later on subjected to analog-to-digital conversion.

While the specification concludes with claims particularly pointing out and distinctly claiming the subject matter which is regarded as the invention, it is believed that the invention, the objects and features of the invention, and further objects, features, and advantages thereof will be better understood from the following description taken in connection with the accompanying drawing, in which:

FIGURE 1 illustrates a block diagram, partially including a detailed wiring diagram of a modulating, recording, playback and signal reconstruction circuit in accordance with the preferred embodiment of the invention; and FIGURES 2A through 2D illustrate diagrammatically waveforms of signals that occur at various places within the system shown in FIGURE 1.

Proceeding now to the detailed description of the drawing. In FIGURE 1 thereof, there is shown a source 10 of analog signals, the waveform of which is to be stored and preserved. The analog signal furnished by source 10 is to be recorded on a magnetic tape 11, the principal objective being thereby to maintain the waveform and details of amplitude variations within a predetermined and critical frequency spectrum. It is of particular importance, that as the signal progresses, the amplitude variations are to be reproduced in proper mutual and preferably linear relationship over a large db range without being distorted by deviations of the tape speed during recording or reproducing. It is not important to maintain the true relationship of such amplitude variations. This is particularly so when later on the analog signal is digitized.

The analog signal from source 10 is first passed to an input attenuator 12 which is adjustable manually to determine the signal level as transmitted. The attenuated signal from source 10 is then passed into a filter 13 being of the low-pass type, to remove its signal frequencies beyond the spectrum of interest and which would represent noise only.

The output of the filter 13 is fed to a reading instrument 14 indicating the signal level, to enable the person operating this recorder to observe the signal level and to adjust the input attenuator 12 accordingly. The signal filtered and adjusted to a proper range of levels is now ready for direct processing for recoding. FIGURE 2A, cuve 10′ depicts a representative example of such an analog signal. The recording is being done in accordance with a novel method and system of modulation.

There is, first of all, provided a sawtooth or ramp-function generator 15 providing a coherent sawtooth wave train such as (15′, 15″) illustrated also in FIGURE 2A. The principal characteristics of this sawtooth generator output is that its frequency is constant to a very high extent so that the oscillation period T of succeeding sawtooth waves is constant indeed. Another characteristics is that the sawtooh generator 15 furnishes linearly rising signals (15′) being linear indeed to very accurate degree. Deviations of the linearity should be smaller than the desired degree of amplitude discrimination as far as the analog signal from source 10 is concerned. The trailing flank 15″ of each sawtooth wave should be very steep.

Another characteristics of the sawtooth generator 15 is that the peak value A of the sawtooth wave furnished by its exceds the peak value of the attenuated and filtered analog signal 10′. This value A represents the maximum amplitude mentioned above and against which the analog signal will be referenced. One can see that the attenuator 12 is provided here for the specific purpose to adjust the input signal level to meet the requirement, that any analog signal processed for recording remains below level A.

The oscillator-generator 15 illustrated possesses the required features. Generator 15 is comprised first of an RC circuit which includes a series circuit connection of an adjustable resistor 15–5 and two capacitors 15–4 and 15–7, respectively. The junction between capacitors and resistors connects to the emitter electrode of a unijunction transistor or double base diode 15–1. This establishes the basic oscillator circuit.

During operation, the capacitors 15–4 and 15–7, the latter being preferably twice as large as the former, charge via resistor 15–5, the resistanec of the unijunction transistor or double base diode 15–1 then being large. Upon reaching the breakthrough voltage of this transistor 15–1, the capacitors discharge through the low impedance path in element 15–1 very rapidly and in accordance with the negative resistance region of the characteristics thereof.

The capacitors 15–5, 15–7 as well as the resistor 15–5, of course, define the frequency or time base of the sawtooth oscillator. The unijunction transistor 15–1, further has its emitter coupled to the base of a transistor 15–2 which provides for a feedback control for purposes of linearizing the output to be drawn from a second transistor 15–3. The feedback loop is further provided by an adjustable resistor 15–6 coupling the emitter of transistor 15–2 to the junction of capacitors 15–4 and 15–7.

During charging of the capacitors 15–4 and 15–7, the base of transistor 15–2 receives rising potential to more open the emitter-collector path thereof, but the negative bias of the emitter of transistor 15–2 increases likewise. Since capacitor 15–7 is larger than capacitor 15–4, adjusting of resistor 15–6 permits balancing of the otherwise exponential charge characteristics of the capacitors, if there were no feedback, so as to result in a linearly rising potential at the base of transistor 15–3. Thus, the feedback loop causes effective inversion of the exponential curvature of the charging of capacitor 15–7 relative to the exponential charge curve of capacitor 15–4, so that the curvatures offset each other, to provide a linear output.

Next, there is provided a signal comparator such as a differential amplifier 16 receiving, on one hand, the filtered analog signal as derived from filter 13, and receiving, on the other hand, the sawtooth waves 15′, 15″ drawn from outputer (emitter) of transistor 15–3. The comparator 16 preferably is biased to such an extent that it produces a first constant signal output, when within a very small tolerance range the signal from filter 13 is smaller than the instantaneous value of sawtooth waves 15′, 15″. The output of comparator 16 flips to a second, also constant signal level, as long as the instantaneous value of a sawtooth wave 15′, 15″ exceeds the instantaneous analog value from filter 13.

The changeover from one output signal level of comparator 16 to the other is to occur within a very small signal amplitude range, which again is given by a db value below the desired discrimination capability of the system as to amplitude variations in the analog signals as furnished by source 10.

The differential amplifier 16 illustrated possesses these characteristics. The comparator or differential amplifier 16 is comprised of the two transistors 16–1 and 16–2 connected in common emitter configuration. The base electrode of transistor 16–1 receives the sawtooth voltage drawn from the emitter of transistor 15–3 of the oscillator 15. The base electrode of transistor 16–2 receives the output of the low-pass filter, i.e. the filtered analog signal. The output voltage is drawn for proper configuration from the collector electrode of the transistor 16–1.

The output of comparator 16 is, therefore, provided in a manner which can best be understood with reference to FIGURE 2A: The output of comparator 16 will be on one level, for example, pulse or signal level I, as long as the dashed line 15′ (or 15″) representing the sawtooth generator output is below the solid line 10′ representing the attenuated and filtered analog signal. The output of comparator 16 will have a second level, for example, defined by O if the dash line of the sawtooth wave 15′ (or 15″) exceeds the instantaneous analog value defined by the solid line 10′. The resulting pulse train of the illustrated example is shown in FIGURE 2B.

It, therefore, appears that the comparator 16 produces an output signal defined by voltage blocks of constant signal value I. The pulses commence at a constant rate defined by the frequency of the sawtooth generator 15 and always when output 15″ drops to zero. One can see here the reason why the trailing edge of any sawtooth pulse is to have very steep flank. Basically, a new pulse is produced at the instant curve 15″ traverses the then existing analog signal. However, the leading edge of each output pulse of comparator 16 is to be substantially independent from the analog signal. Thus, curve portion 15″ must be vertical indeed to render the intersection of 15″–10′ independent from time.

Thus, succeeding voltage blocks have respectively leading edges P1 succeeding each other by the constant time T. Each voltage block is terminated when the output of comparator 16 drops to the value 0 at a time given by the intersection of lines 15′ and 10′. This defines the trailing edges P2. The time of the trailing edge of any pulse in relation to its leading edge varies in accordance with the instantaneous amplitude of the analog signal 10′. A voltage block will be longer, the higher the instantaneous analog signal is, it will be shorter the longer the analog signal is.

Since the sawtooth wave 15′ is to be a very linear one, the extension or shortening of the voltage blocks furnished by the comparator 16 vary linearly in proportion to the amplitude of the analog signal 10′. One can see here specifically why for proper operation it is necessary that the analog signal 10′ always remain below the peak value of the sawtooth 15′; if that were not the case a continuous signal would be furnished by the comparator 16, and the constant rate signal as defined by the leading edges of these pulses would disappear. In general, this would defeat the intended purpose. Though it should be mentioned that the comparator 16 may exercise limiter functions. Absence of a trailing edge P2 is an indication that the analog signal has exceeded a predetermined value (A) and it is conceivable that a waiting out of this period of duration of an excessive signal is desired in special cases.

The output signal of comparator 16 and as representatively illustrated in FIGURE 2B is now provided to a driver stage 17 such as an amplifier having sufficient gain to drive a recording transducer 18 juxtaposedly positioned to the magnetic tape 11. The signal that in effect will now be recorded is that at each pulse edge the magnetization provided to the tape is reversed.

The tape 11 now may be subjected to speed variations such as resulting from the known phenomena called wow and flutter. Such variations will possibly disturb and distort the relations and mutual phase positions of the pulse edges P1 and P2 as they are in fact recorded. However, in view of the recording method used, one knows that within this system of recorded pulses every change in magnetization in one direction and having resulted originally from the leading edges of these pulses 16′, did occur at a constant rate.

FIGURE 2C now illustrates the output signal when the tape 11 is read by means of a read transducer such as 20. Th positive pulses P1′ represent the leading edges of the recorded pulses and the negative pulses P2′ represent the trailing edges. These pulses are easily distinguishable, and one knows that any pulse pair P1′—P1′ defines (1) a fixed time base that is constant throughout the recording, and (2) is in effect representative of the maximum amplitude A of the sawtooth generator, serving as a relative scale value or unit for the analog information. Thus, the pulse train P1′ is in effect a reference signal which in toto defines a recording time scale, but which may not appear at a constant rate thereby defining "individual" time-reference increments.

One also knows that the time from a pulse P1′ to the next pulse P2′ is representative of the instantaneous amplitude of the analog signal within a time given by the time interval P1′—P1′ and defining the tolerance given by this period of time.

Thus, regardless of the absolute values of pulse spacings during reproducing, one knows that three succeeding pulses, i.e. a pulse P1′, the succeeding pulse P2′ and the then succeeding pulse P1′ are related as follows: the ratio of the time P1′–P2′ over the time P1′—P1′ is equal to the ratio of instantaneous amplitude A′ over the sawtooth amplitude A and within a range of tolerance given by conceivable amplitude variations of the signal 10′ within each of the original periods T. This ratio is independent from any deviation of the reproducing time base P1′—P1′ from T, since the information as defined by the time P1′–P2′ is proportionally distorted.

This knowledge now is being used to rebuild the analog signal in its original waveform during the reproducing mode. There may be provided a read or reproducing transducer 20 magnetically coupled to the tape 11 and providing output pulses as illustrated in FIGURE 2C. FIGURE 2C is intentionally shown in a distorted time-phase relationship relative to FIGURES 2A and 2B to indicate that there were speed variations during recording and/or reproducing. The output to transducer 20 is fed to a preamplifier and filter 21 to eliminate tape noise, and the output of filter 21, in turn, feeds a second filter 22 which improves pulse rise time, which in effect means that it slims the pulses P1 and P2′. The output of the filter 22 now represents very sharp pulses having a very accurately defined and usable mutual phase relationship (FIGURE 2C). The output of filter 22 is then fed to a phase splitter 23 feeding the respective positive pulses representing P1′ to a first channel 24 while feeding the negative pulses representing P2′ into a channel 25. The signal in channel 24, i.e. the pulses P2′ are now used to set a flip-flop 26 of the DC type whereas the pulses P2′ in channel 25 are used to reset flip-flop 26.

The output of flip-flop 26 is the wave train shown in FIGURE 2D. This wave train is characterized by pulses of constant amplitude, and it is further characterized in that the respective length of a pulse over the time delay L of the leading edges of two succeeding pulses is equal to the above-defined amplitude ratio A′ over A regardless whether the time L equals the period time T or not.

The output of flip-flop 26 is fed to an integrator stage 27 which in effect is another low-pass filter eliminating the frequency of the sawtooth generator oscillations at reproduction (range of oscillation periods L) and having a frequency passing range which possibly includes frequency variations as resulting from tape flutter. As a result, this low-pass filter 27 produces a DC signal of variable amplitude which is an exact replica of the analog information 10′ possibly at a different and instantly distorted time scale, but wherein the relative amplitude relations as succeeding increments are maintained and are discernible within the frequency spectrum of interest; and wherein further the reproduced envelope contains all the information without superpositioning of a demodulated tape flutter and wow.

As was mentioned briefly above, this system can be used as follows: The source of analog signals 10 may, for example, be a transducer which measures heartbeat and electrocardiogram or the like. Such a wave signal train is then recorded on the tape for storage. Since the information includes a frequency range below the kc. range, but extends to DC, the pulse rate frequency of oscillator 15 needs only to be a few kc. which permits the recorder to run a very slow tape speed. It is conceivable to record for many hours with a simple recorder of normal capacity, thoughout the night. The data retriever system disclosed above enables reconstruction of the original waveform whereby, as will be remenbered, the time scale of the rebuilding the waveform is entirely immaterial. The tape, for example, may be played back at a much higher speed than the original recording, so that the tape can be evaluated within a few minutes. The signal furnished by the integrator filter 27 will strictly reproduce the original waveform. The purpose thereof is that this waveform can be compared with standard waveforms automatically. A permanent memory device may include all possible types of deviation from normal to classify heart defects. The measured waveform is then compared with the memory content to detect the type of heart defects the patient has from whom the curve was taken. The advantages of the system are imminent. A centralized "heart bank" can be equipped with an extensive memory serving the entire nation and permitting the rapid evaluation of recordings made with a large variety of high and low quality tape recorders, provided the modulation scheme presently suggested is used permitting evaluation entirely independent from the tape speed of the recorder and independent from the extent with which such tape speed was kept constant during recording.

It was assumed and specifically emphasized that the generator 15 provides linear sawtooth oscillations. This insures strict linearity as between analog signals and pulse duration. If, for example, compression of the amplitude of the analog signal is desired to accommodate a large range, the linearity may be dispensed with in lieu of, for example, a logarithmic or exponential function generator, but the steep trailing edge such as 15'' has to be retained to define constant time scale increments to be used later on for rebuilding the analog signal after playback. Then, of course, it is necessary to provide additionally a function inverter in the form of an exponential or logarithmic amplifier at the output side of integrator 27 to restore the original amplitude waveform.

The analog signal output of integrator filter 27 may be needed in forms of digitized signals. Here it is of importance, that the pulses P1' defining an orginally constant rate time scale, can be used to trigger or clock an analog to digital converter, and this permits complete reconstruction of the original signal in its true time scale, by passing the irregularly clocked digitized signals into a binary signal type storage device and calling the stored signals at a constant rate, for example, that of the original oscillator frequency of oscillator 15.

The invention is not limited to the embodiments described above, but all changes and modifications thereof not constituting departures from the spirit and scope of the invention are intended to be covered by the following claims.

What is claimed is:

1. A system for processing analog information for recording on a magnetic tape, comprising:

a ramp function generator oscillator providing a ramp function at constant slope and fixed time base, thereby establishing oscillations of fixed and constant frequency; and a differential amplifier having first and second input terminals, the first input terminal being connected to receive said oscillations, the second input terminal being provided to receive analog information signals, the output of said amplifier being at a first signal level when the amplitude of the input signal at said first input terminal exceeds the amplitude of the input at said second input terminal, said output being at a second signal level when the signal amplitude at said second input terminal exceeds the signal amplitude at said first input terminal.

2. A system for processing analog signals recorded in modulated format on a tape as set forth in claim 1, comprising:

a tape reading transducer for reading said tape and providing first and second interspaced pulse trains, said first pulse train representing said leading edges, said second pulse train representing said trailing edges, signal means providing pulses of constant amplitude, respectively beginning and ending at a pulse from said first train and a respectively succeeding second train pulse; and filter means connected to said signal means to remove from the output thereof the frequency of said first pulse train.

3. A system for processing analog information, for purposes of recording such information on a magnetic tape, comprising:

a ramp function generator oscillator producing ramp functions of constant slope and at a fixed time base by establishing sawtooth oscillations of fixed frequency;

means for receiving an analog signal to be recorded; and a comparator stage respectively responsive to said ramp function generator and said analog signals and respectively providing two signal levels depending upon which of the input signal amplitudes at said comparator exceeds the respective other signal amplitude.

4. A system for processing analog signals recorded in modulated format on a magnetic tape as set forth in claim 3, comprising:

a carrier reading element providing first and second interspaced pulse trains, said first pulse train representing said leading edges, said second pulse train representing said trailing edges, signal means providing pulses of constant amplitude, respectively beginning and ending at a pulse from said first train and a respectively succeeding second train pulse; and filter means connected to said signal means to remove from the output thereof the frequency of said first pulse train.

5. A method of processing analog signals, comprising: providing sawtooth oscillations at a constant rate, each oscillation having a linearly rising leading slope and a steep trailing edge; referencing said oscillations against an analog signal to produce a pulse train, the respective leading edges of such pulses coinciding with the trailing edges of said oscillations and the respective trailing edges of said pulses occurring when the linearly rising oscillation equals the instantaneous analog value; recording said pulses on a magnetic tape; reading said magnetic tape and providing first and second pulse trains respectively representing leading and trailing edges of said pulses; and reconstructing said analog signal out of said first and second pulse trains by providing pulses of constant amplitude respectively beginning and ending at pulses, one of said first and one of said second trains; and removing the frequency of said oscillations.

6. A system for processing analog information for recording on a storage carrier, comprising:

a source of analog signals to be recorded;

a sawtooth generator producing sawtooth oscillations in which phases of constantly rising slope alternate with a sudden drop to a reference level after a fixed period of time has elapsed in between sequential ones of the drops;

pulse producing means connected to said source and to said generator for producing for each cycle of the oscillations, an electrical pulse of essentially constant amplitude, the leading edge of which respectively coinciding with the drop of said sawtooth wave to the reference level substantially independent from the instantaneous analog signal level and terminating when the rising slope value of said generator is equal to the instantaneous analog signal level; and a transducer connected for receiving said pulses for recording them on said carrier.

7. A system for recording analog information on a magnetic tape, comprising:

a source of analog signals to be recorded;

a sawtooth generator producing sawtooth oscillations each oscillation being defined by linearly rising slope followed by a sudden drop to a reference value after a fixed period of time has elapsed in between sequential ones of such drops;

comparator means connected to the source and to the sawtooth generator for producing a train of electrical pulses, constituted by a sequence of alternations between two essentially constant signal levels, the leading edge of a pulse of the train respectively coinciding with a drop of said sawtooth wave to the reference value essentially independent from the amplitude of the concurrently effective analog signal value, the pulse terminating when the respectively succeeding rising slope value as produced by said generator is equal to the instantaneous analog signal level; and a transducer responsive to said electrical pulses for recording the pulses as defined by the sequence alternations between two signal levels on the magnetic tape respectively as oppositely directed magnetizations.

8. A system for recording cardiac information or the like, comprising:

a transducer for producing electrical signals representative of the cardiac information in form of analog signals;

a sawtooth generator providing a ramp function at constant slope alternating with a rapid change in amplitude to provide sawtooth oscillations at a fixed frequency;

a differential amplifier having first and second input terminals, the first input terminal being connected to receive said oscillations, the second input terminal being provided to receive analog information signals, the output of said amplifier being at a first signal level when the amplitude of the input signal at said first input terminal exceeds the amplitude at the input of said second input terminal, said output being at a second signal level when the signal amplitude at said second input terminal exceeds the signal amplitude at said first input terminal; and a transducer connected to said amplifier for recording on a magnetic tape the alternations between the first and the second signal level as alternating magnetizations.

References Cited

UNITED STATES PATENTS

| | | | |
|---|---|---|---|
| 2,950,352 | 8/1960 | Belck ____________ | 179—100.2 |
| 3,009,025 | 11/1961 | Takayanagi et al. ___ | 179—100.2 |

BERNARD KONICK, *Primary Examiner.*

J. R. GOUDEAU, *Assistant Examiner.*

U.S. Cl. X.R.

329—106; 332—9; 346—74